Dec. 31, 1935.   G. F. BRETT   2,025,934

ELECTRIC GLOW DISCHARGE DEVICE

Filed May 26, 1934

INVENTOR
GEORGE FAIRBURN BRETT
BY
ATTORNEY

Patented Dec. 31, 1935

2,025,934

UNITED STATES PATENT OFFICE 2,025,934

ELECTRIC GLOW DISCHARGE DEVICE

George Fairburn Brett, Yorkshire, England, assignor to Radio Corporation of America, a corporation of Delaware Application May 26, 1934, Serial No. 727,685
In Great Britain June 2, 1933

6 Claims. (Cl. 176—122)

This invention relates to electric glow discharge devices and has for its object to provide an improved, efficient glow discharge device suitable for use in television, picture telegraph and like systems.

As is well known, the gas fillings of certain gas filled electric glow discharge devices have the property of absorbing light of the same color as that which is omitted. Thus, to take what is probably the most important case, a sodium vapor electric lamp emits light corresponding to the yellow D lines of the spectrum and sodium vapor, of course, absorbs light of this color. This fact leads to a certain amount of inefficiency in gas filled electric glow discharge lamps wherein the discharge takes place between two electrodes in a gas filled tubular or similar envelope. This inefficiency is due to the fact that in an ordinary cylindrical discharge, such as occurs in the ordinary form of tubular glow discharge lamp, the central portions of the discharge involve, of course, the consumption of electric current but a corresponding amount of useful light is not obtained since the light from the said inner or central portions of the discharge are to a large extent absorbed by the gas surrounding those portions. The object of the present invention is to avoid this difficulty and thus produce a lamp of improved efficiency.

According to this invention there is provided in a gas filled electric glow discharge lamp, an obstruction positioned between the electrodes between which the discharge occurs, said obstruction blocking out a substantial portion of the middle of the discharge space and constraining the discharge to occur outwardly of the obstruction so that the effective discharge space is of reduced dimensions at right angles to the direction of discharge. For example, the discharge space, instead of being of solid cylindrical form, may be caused by the obstruction to be of hollow cylindrical form. In this way the defect above referred to is avoided to a substantial extent since there will be no substantial portion of the discharge which is effectively masked by surrounding gas of a material able to absorb the light emitted by that portion.

The invention is illustrated in and further explained in connection with the accompanying diagrammatic drawing.

Figure 1:
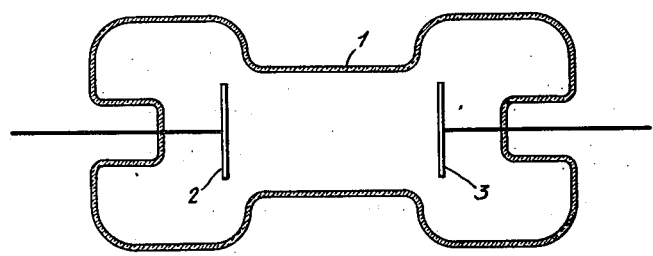
Figure 2:
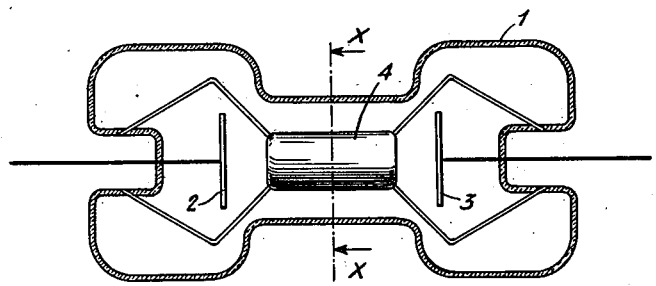
Figure 3:
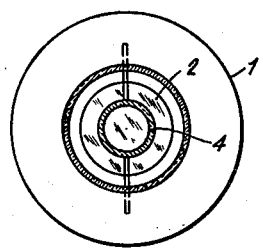

Referring to Figure 1 this shows a known form of sodium electric discharge tube in which a cylindrical discharge is set up in a neck 1 between electrodes 2 and 3. In such an arrangement a considerable inefficiency will occur by reason of the fact that light from the central portions of the discharge in the neck will be absorbed by the surrounding portions. This defect is avoided in one way of carrying out the invention, by modifying the tube of Figure 1 as shown in Figures 2 and 3, i. e., by providing within the envelope and supported therein in any convenient manner, for example from the footstep, a cylindrical obstruction 4 made of glass and of smaller diameter than the envelope, this obstruction 4 being so positioned as to leave an annular space between itself and the envelope. With such a lamp the discharge will, of course, occur along the annular space. Figure 2 represents in sectional elevation the portion of the tube in which the discharge occurs and Figure 3 is a sectional end view on the line X—X of Figure 2.

The annular or similar space left by the obstruction 4 should not be so small in a direction at right angles to the direction of discharge that a substantially uniform discharge is not obtained.

From a comparison of a lamp represented by Figures 2 and 3 with a lamp as at present in common use, e. g., as shown in Figure 1 and wherein the discharge between the electrodes occurs in a simple cylindrical envelope portion, it will be seen that in the known lamp the light emitted from the portion of the gas filling at and near the axis of the cylindrical discharge, will be largely absorbed by the gas filling around that portion whereas in the lamp shown in Figures 2 and 3 this central portion of the gas filling is in effect omitted and in consequence the efficiency of the lamp as a whole will be raised, the discharge occurring only in the annular space so that the light therefrom is not to any substantial extent masked.

The invention is applicable to discharge devices having either hot or cold cathodes and is not limited to tubes having any particular shape of envelope obstruction or electrodes.

The invention is obviously of most advantage in comparatively large tubes.

Having now described the invention what is claimed is:

1. An electric glow discharge device comprising a transparent envelope wherein is contained two plane electrodes, and a vitreous obstruction contained within the envelope and interposed between the plane electrodes.

2. An electric gas discharge device comprising a transparent envelope, two plane electrodes, and a solid vitreous member, said electrodes being separated within the envelope and said vitreous member being interposed between said electrodes.

3. An electric glow discharge device comprising a transparent envelope, two plane electrodes, and a solid symmetrical vitreous member, said electrodes being separated within the envelope, and said vitreous member being symmetrically interposed along the common axis of the said electrodes.

4. An electric gas discharge device comprising a transparent envelope, two symmetrical plane electrodes, a solid symmetrical vitreous member, and a supporting structure for said member, said electrodes being symmetrically positioned within the envelope, and said vitreous member being symmetrically interposed between said electrodes.

5. An electric gas discharge device comprising a transparent envelope, two plane electrodes, a solid vitreous member, and a supporting structure for said vitreous member, said electrodes being separated within the envelope, and said vitreous member being interposed between said electrodes.

6. An electric glow discharge device comprising a transparent envelope, two symmetrical plane electrodes, a solid symmetrical vitreous member, a supporting structure therefor, said electrodes being symmetrically positioned along the common axis of the two electrodes.

GEORGE FAIRBURN BRETT.